United States Patent [19]

Kilburg

[11] Patent Number: 5,161,667
[45] Date of Patent: Nov. 10, 1992

[54] ELECTRICAL CONDUCTOR RAIL AND METHOD OF MAKING

[75] Inventor: Ronald J. Kilburg, Redwood City, Calif.

[73] Assignee: Insul-8 Corporation, Harlan, Iowa

[21] Appl. No.: 677,306

[22] Filed: Mar. 29, 1991

[51] Int. Cl.$^5$ .............................................. B60M 1/30
[52] U.S. Cl. ......................... 191/29 DM; 191/22 DM
[58] Field of Search .............. 191/22 R, 22 DM, 29 R, 191/29 DM, 32; 238/143

[56] References Cited

U.S. PATENT DOCUMENTS

| | | | |
|---|---|---|---|
| 3,341,669 | 9/1967 | Martin et al. | 191/32 X |
| 3,405,240 | 10/1968 | Kilburg . | |
| 3,733,696 | 5/1973 | Scofield et al. | 191/22 DM X |
| 3,830,989 | 8/1974 | Laurent | 191/29 DM |
| 3,902,579 | 9/1975 | Howell, Jr. | 238/143 X |
| 3,917,039 | 11/1975 | Maitland | 191/29 DM |
| 4,005,255 | 1/1977 | Wagner et al. . | |
| 4,014,417 | 3/1977 | Kugler et al. . | |
| 4,215,770 | 8/1980 | Bormann . | |
| 5,061,829 | 10/1991 | Mier | 191/22 DM |

FOREIGN PATENT DOCUMENTS

| | | | |
|---|---|---|---|
| 2435641 | 2/1975 | Fed. Rep. of Germany | 191/22 DM |
| 2546026 | 4/1977 | Fed. Rep. of Germany | 191/29 DM |
| 0139526 | 6/1986 | Japan | 191/29 DM |
| 0143235 | 6/1986 | Japan | 191/29 DM |

Primary Examiner—David A. Bucci
Assistant Examiner—Scott L. Lowe
Attorney, Agent, or Firm—Knobbe, Martens, Olson & Bear

[57] ABSTRACT

A conductor rail is made of an aluminum conductor bar covered with a stainless steel contact cap. The cap is pressed against the top of the conductor bar during assembly and is permanently clamped to the bar by integral ears deformed over and down onto doubled over edges the side legs of the contact cap, holding the outer legs of the contact cap in tension, holding the cap against the top of the conductor bar.

10 Claims, 5 Drawing Sheets 5,161,667

ELECTRICAL CONDUCTOR RAIL AND METHOD OF MAKING

BACKGROUND OF THE INVENTION

This invention relates to electrical distribution systems having conductor rails on which current collectors are in sliding contact and more specifically relates to an improved composite conductor rail for such electrical distribution systems.

A conductor rail provides a continuous contact surface from which to collect current by a sliding contactor consisting of a take-off shoe or slipper. Such conductor rails are used for electrical distribution in transit systems and overhead electrification systems for moving cranes and trolleys. Large currents may be demanded, e.g., in transit systems where the conductor rails, sometimes referred to as third-rails, run parallel to the wright bearing tracks and provide current to contactors moving at various speeds, the contactors taking off currents of 500 amps to two, three or four times that much depending on speed of transit vehicle and its weight load.

To transfer currents of this magnitude from the energy source to the moving vehicle, there must be minimal electrical resistance in the conductor rail. Further, the contact surface of conductor rails must be smooth and flat to allow a take-off shoe to make good electrical contact and also resist the wear of the constant sliding of the contactor under pressure. Accordingly, the conductor rail must be structurally sound to withstand this wear and pressure and at the same time be a good conductor having low electrical resistance. Low cost is also essential, especially for transit systems which may require miles of conductor rails.

Conductor bars of aluminum are presently used as the primary current carrier, having low electrical resistance, good structural strength and being lighter in weight and lower in cost than other materials previously used as the main conductors for electrical distribution, such as ferrous metals. Despite the advantages of aluminum conductor bars, problems of a relatively high coefficient of friction and lack of hardness to withstand the constant pressure and friction of the sliding collector still exist. A contact surface of harder material with good electrical conductance, such as steel, has been incorporated into composite conductor rails to withstand the wear from the constant friction of the sliding contactor.

Attachment of a contact surface or cap over the aluminum conductor bar has been accomplished in a variety of methods. One method shown in U.S. Pat. No. 3,341,669 utilizes a composite wherein the conductor bar has been bifurcated at its top surface and each side of this surface has been tapered inwardly with a cap of E-shaped cross-section placed over the conductor bar end and the outer legs of the "E" crimped over the conductor bar forming a mechanical interlock. In this arrangement the more ductile aluminum yields to the pressure of deforming the steel cap; and as the resilience of the steel causes the edge of the cap to move away from the conductor, the integrity of the composite could be adversely affected.

In another method of attachment shown in U.S. Pat. No. 3,733,696, a stainless steel cap is mechanically held by spaced nails driven through side legs of the cap and into an aluminum conductor bar. In a variation of that, pointed projections, sometimes called dinks, are punched into the cap side legs, forming dimples in the conductor bar that capture the projections. Conductive grease between the cap and the bar further aids good electrical connection. While these approaches have been very successful, some variations in the smoothness or levelness of the cap contact surface, and some variations in the conductive path are created by these spaced attachment methods.

Other arrangements have included drilling holes through the side walls of the steel cap and either into or through the aluminum conductor bar, attaching the caps by bolting the caps to the bar or welding plugs driven into the holes in the bar and cap. All of the foregoing arrangements necessitate penetration of the cap for assembly and thus require either added labor or extra power to penetrate the hard steel contact cap.

Another method of attachment shown in U.S. Pat. No. 3,917,039 is clamping a spring-like cap over the aluminum conductor. In such an arrangement the retention is reversible and could permit dislodging of the cap accidentally.

Another composite of a contact cap on a conductor bar comprises an aluminum bar having a V-shaped concave cross-sectional configuration and a V-shaped contact strip held to the surface of the conductor bar by integral aluminum flanges folded over the edges of the contact strip. Such an arrangement is illustrated in U.S. Pat. No. 3,830,989.

The present invention provides an improved composite conductor rail and a method of making same.

SUMMARY OF THE INVENTION

This invention comprises a composite conductor rail including an extruded conductor bar made of a material having structural strength and good electrical conductivity, such as an aluminum alloy, and a flat, smooth contact cap made of a wear resistant, relatively low electrical resistance sheet metal such as a stainless steel alloy. Ends of the contact cap are clamped into cavities formed in the sidewalls of the conductor bar and held taut, the stress tending to pull the cap against the top surface of the conductor bar in a continuous attachment arrangement.

In the preferred form of this invention the conductor bar is formed of extruded aluminum. Running lengthwise of the bar is an ear disposed at each sidewall extending upwardly and outwardly from the lower section of each sidewall. Each ear forms an upwardly opening space with the remainder of the bar. The contact cap is a roll formed, flat, stainless steel sheet section with two depending side legs having double thicknesses at their free ends. A flat surface is formed along the folded back edge of the side legs.

In accordance with the method of the invention, the contact cap is pressed onto and forcibly held on the conductor bar with the side legs of the cap protruding into the cavities formed by the bar sidewalls and the ears. Deforming or bending the ears inwardly applies a force against the flat surface along the edge of the side legs, holding the legs in tension and pulling the cap against the surface of the conductor bar. The external holding pressure is no longer required, as the clamping effect of the ears is complete.

A main advantage of the composite structure of this invention is the clamping technique putting tension on the sides of the cap, constantly tending to pull the contact cap into engagement with the top of the conductor bar, thus providing a good electrical connection. Since the clamping is continuous along the length of the rail, desired uniformity and smoothness is obtained. The continuous connection process is also efficient.

DESCRIPTION OF THE PREFERRED EMBODIMENT

Figure 1:
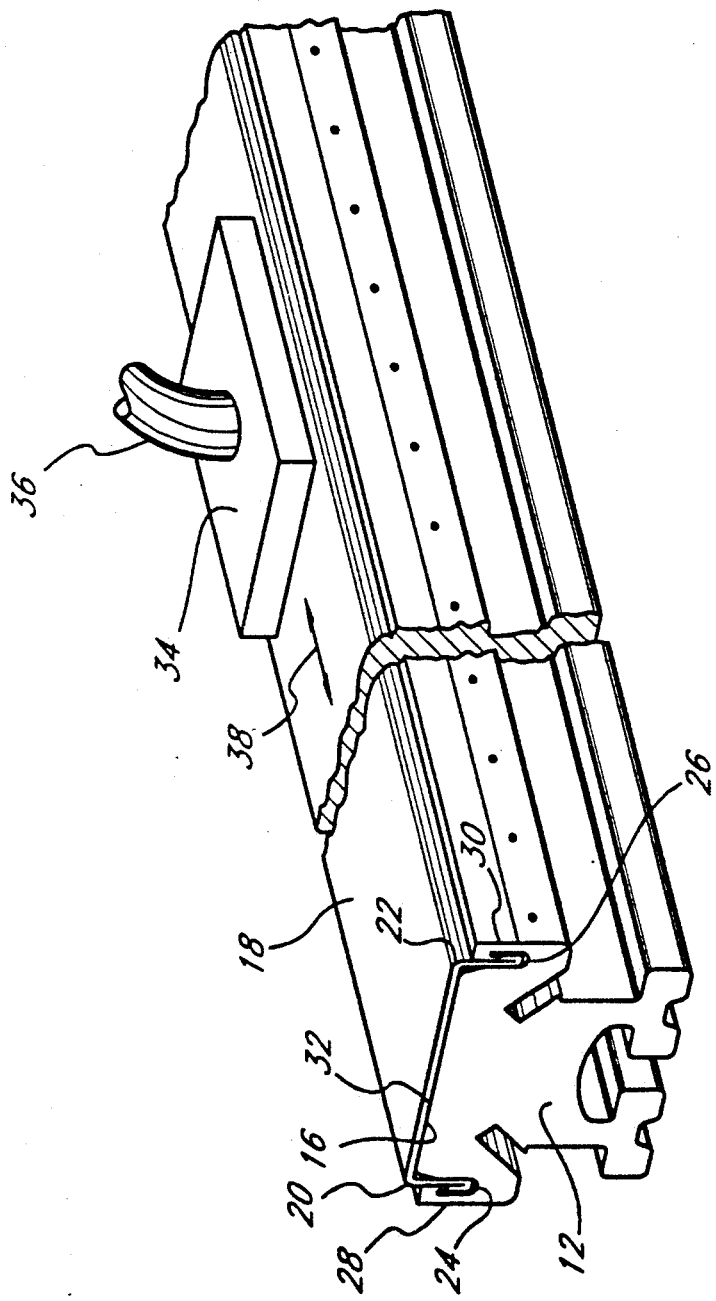
FIG. 1 is a perspective view of an electrical distribution system showing a complete conductor rail of the invention with a current take-off shoe.

Referring to FIG. 1, the composite conductor rail 10 is comprised of an elongated conductor bar 12 of ductile aluminum alloy, extruded in a somewhat rectangularly shaped or I-beam body. The bar 12 includes feet 14 broadly spaced with respect to the height of the bar 12 and an upper flat surface 16.

Protectively covering the top 16 is an elongated section of stainless steel sheet metal, somewhat resilient, flat, smooth surfaced, contact cap 18 having a pair of side legs 20 and 22 extending partially down the sidewalls of the conductor bar 12 into cavities 24 and 26 formed along the sidewalls of the bar. The side legs 20 and 22 are clamped in position by ears 28 and 30 along the sides of the conductor bar 12 and hold the cap 18 taut against the conductor bar top 16.

An electrically conductive compound 32 is sandwiched between the top 16 of the conductor bar 12 and the underside of the contact cap 18, making electrical contact between the conductor bar and the contact cap, enhancing the current flow by reducing the electrical contact resistance.

The conductor rail 10 is used for distributing electric power to electrified moving apparatus. Transmission of current from the conductor rail 10 to such a moving apparatus (not shown) is accomplished by a schematically illustrated, sliding collector or take-off shoe 34 attached to the moving vehicle by a pantograph or other type arm extending from the vehicle and pressing the collector shoe 34 against the conductor rail 10. Current is carried from the contact cap 18 into the collector shoe 34 through the power cable 36 to the user. The collector shoe 34 slides in either longitudinal direction on the cap 18 as shown by the arrow 38.

Figure 2:
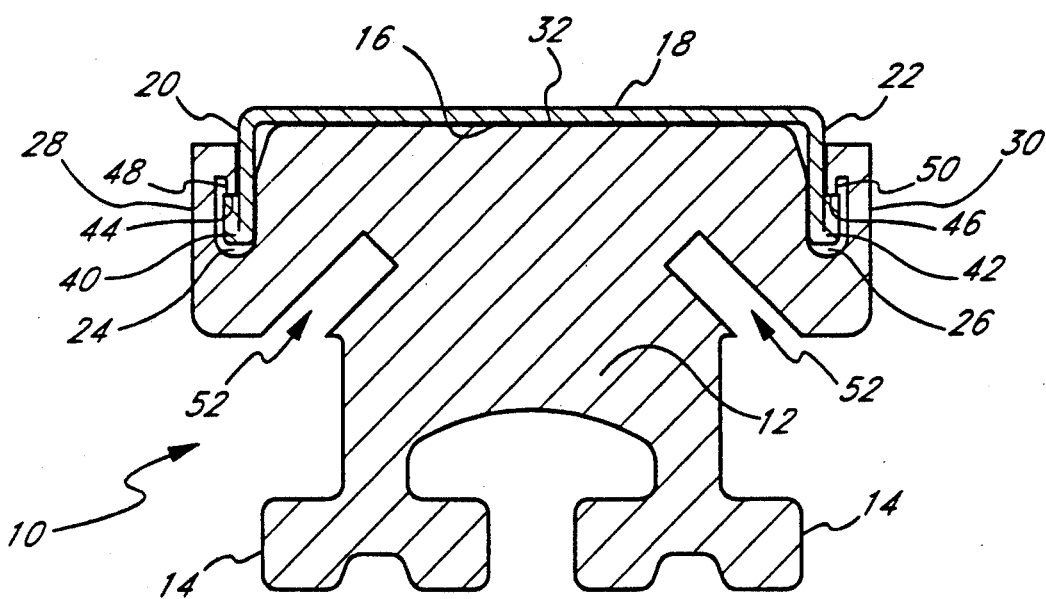
FIG. 2 is a cross-sectional view of the conductor rail of FIG. 1.

The composite conductor rail 10 can be more fully understood by referring to FIG. 2 wherein an end 40 and 42 of the side legs 20 and 22 have been outwardly and upwardly folded over, forming a hem with flat edge surfaces 44 and 46 facing upward and cooperating with tips 48 and 50 of the ears 28 and 30. The side legs 20 and 22 are thus forced downward and held in tension, pulling the cap 18 against the conductor bar top 16. In forming the side legs 20 and 22, the distance from the underside of the cap 18 to the top of the edges 44 and 46 is controlled such that a uniform position of the clamped surfaces 44 and 46 is provided for continuous contact with the full length of the conductor bar 12.

Diagonal slots 52 are included in the extruded aluminum conductor bar 12 to receive heater cables (not shown) for outside use of the conductor rail 10 in cold weather, e.g., to remove or prevent build up of ice on the surface of the contact cap 18.

Conductor feet 14 cooperate with insulating brackets (not shown) to hold the conductor rail 10 in alignment within an electrical distribution system.

Figure 3:
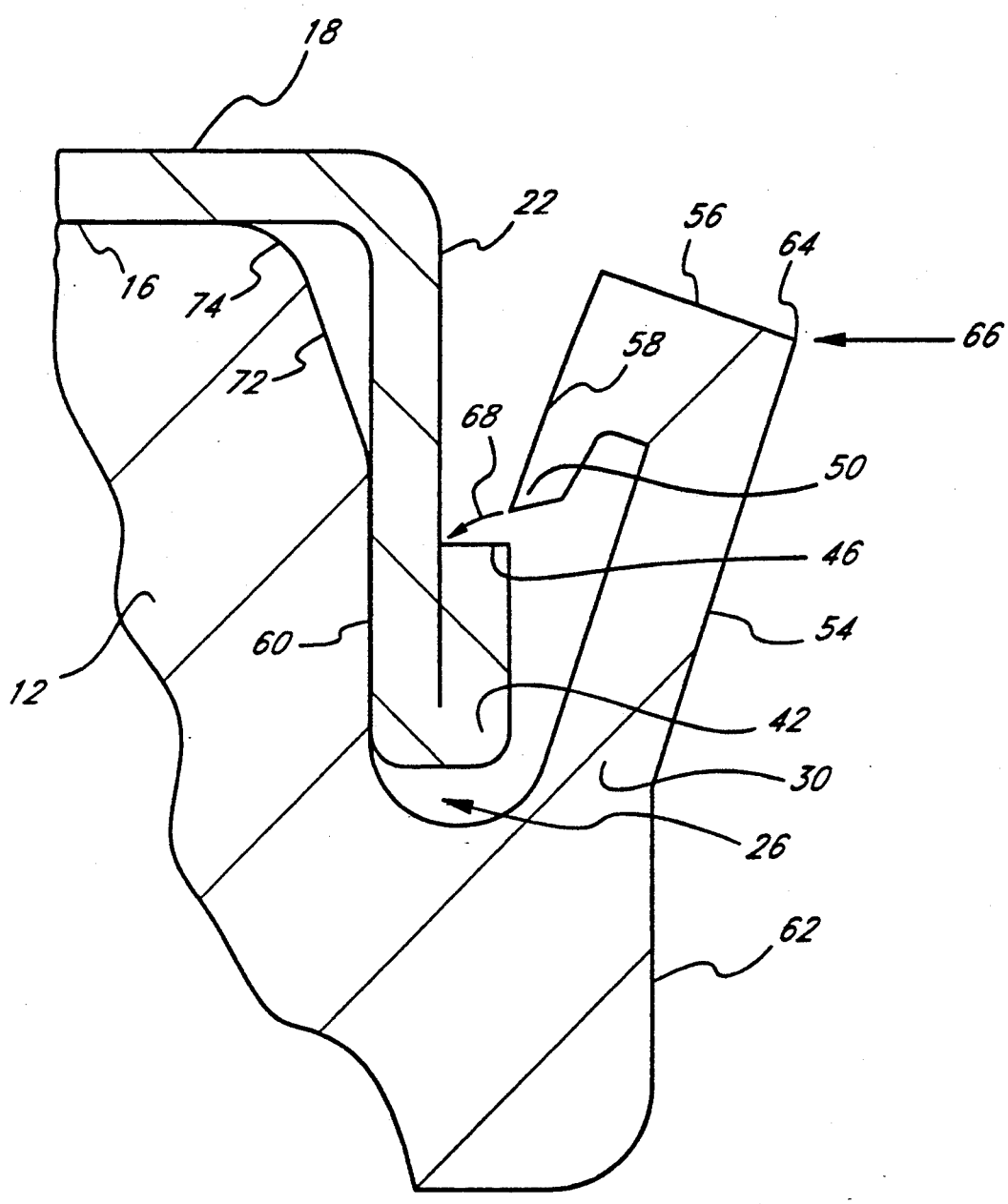
FIG. 3 is an enlarged cross-sectional view of a portion of the conductor rail of FIGS. 1 and 2 with the cap in position on the bar but before the bar is deformed against the cap.

Referring now to FIG. 3, a partial view of the conductor bar 12 has been enlarged to show the position of the ear 30 as extruded. The ear 30 has an outwardly and upwardly extending portion 54 formed obliquely to the main body of the conductor bar 12. Preferably, the outward angle is about 25° with respect to vertical. At the end of this outer portion 54 is formed a projection 56 of slightly greater cross-section than the outer portion 54 and extending inwardly at approximately 90° with respect to portion 54. At the inward most end of this projection 56 is another projection 58 pointing downward to the main body of the conductor bar 12 and essentially parallel to the outer portion 54. This inner projection 58 terminates in a smaller tip 50. The ear 30 is spaced from the sidewall 60 of the main body of the conductor to form a cavity or gap 26 to receive the folded end 42 of the contact cap leg 22.

Preferably, clearance of about 0.015 inches between the tip 50 and the sidewall 60 is sufficient to receive easily the contact cap side leg 22. A slight incline or rake to the upper portion 72 of the sidewall 60, preferably about 10°, facilitates assembly of the cap 18 over the conductor bar 12 and a generous radius 74 at the top 16 of the bar allows the cap side leg 22 to be spread slightly as it enters the cavity 26. The distance between the cap legs before installation on the bar is less than the distance between the bar sides 60, preferably about 0.015 inch.

Figure 4:
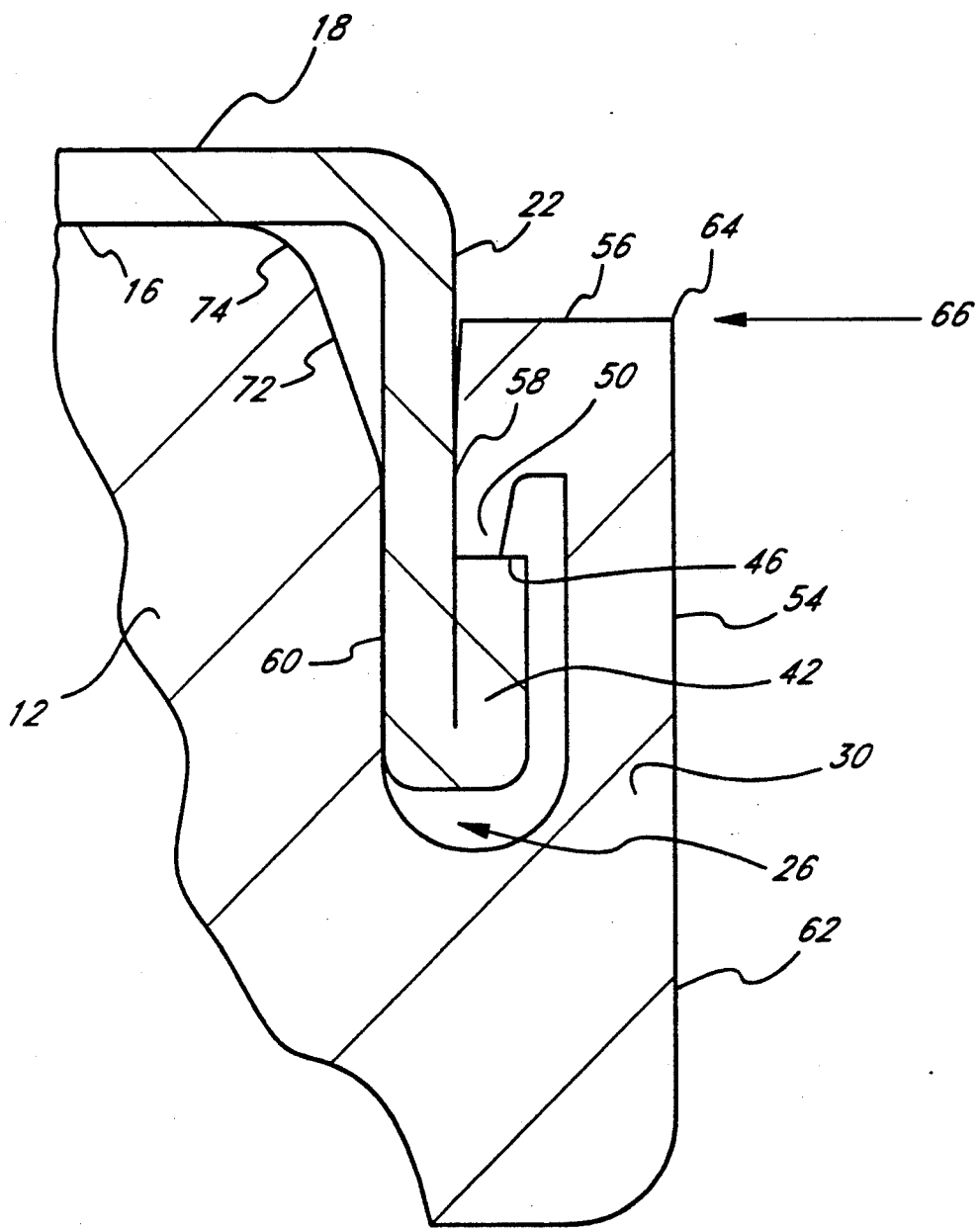
FIG. 4 is an enlarged cross-sectional view of a portion of the conductor bar and contact cap assembled as shown in FIG. 2.

With the cap 18 pressed into the position shown in FIG. 3, the ear 30 is deformed inwardly in the direction shown by the arrow 66 into locked position shown in FIG. 4. The length of the projection 56 of the ear 30 is just short enough to allow the outer member 54 to be pressed inwardly until the outer face of ear 30 is nearly flush with the side face 62 of the conductor bar, and to allow the leg 22 of the contact cap 18 to fit into the cavity 26.

The inner projection 58 of the ear 30 is pressed down against the flat surface 46 of the contact cap end 42 deforming the ear tip 50 and reducing the length of the inner projection 58, by 0.010 to 0.015 of an inch, in a preferred embodiment. This downward force against the flat surface 46 creates tension in the cap side leg 22, pulling the cap 18 against the top surface 16 of the bar 12 and permanently holding the cap in position. The thick projection 56 of the ear 30 accommodates the spring-back movement carried by the cap and hence helps hold the cap in tension. Control of the original position of the flat surface 46 of the cap 18 and the extruded position of the tip 50 of the ear 30 (referring back to FIG. 3) insure proper holding of the cap leg 22, thus pulling cap 18 against the top surface 16 of the bar 12 over the full length of the bar 12. The lower inner surface of the cap leg 22 tightly engages the bar sidewall 60, the cap legs having been spread slightly as the cap is forced into position on the bar.

Figure 5:
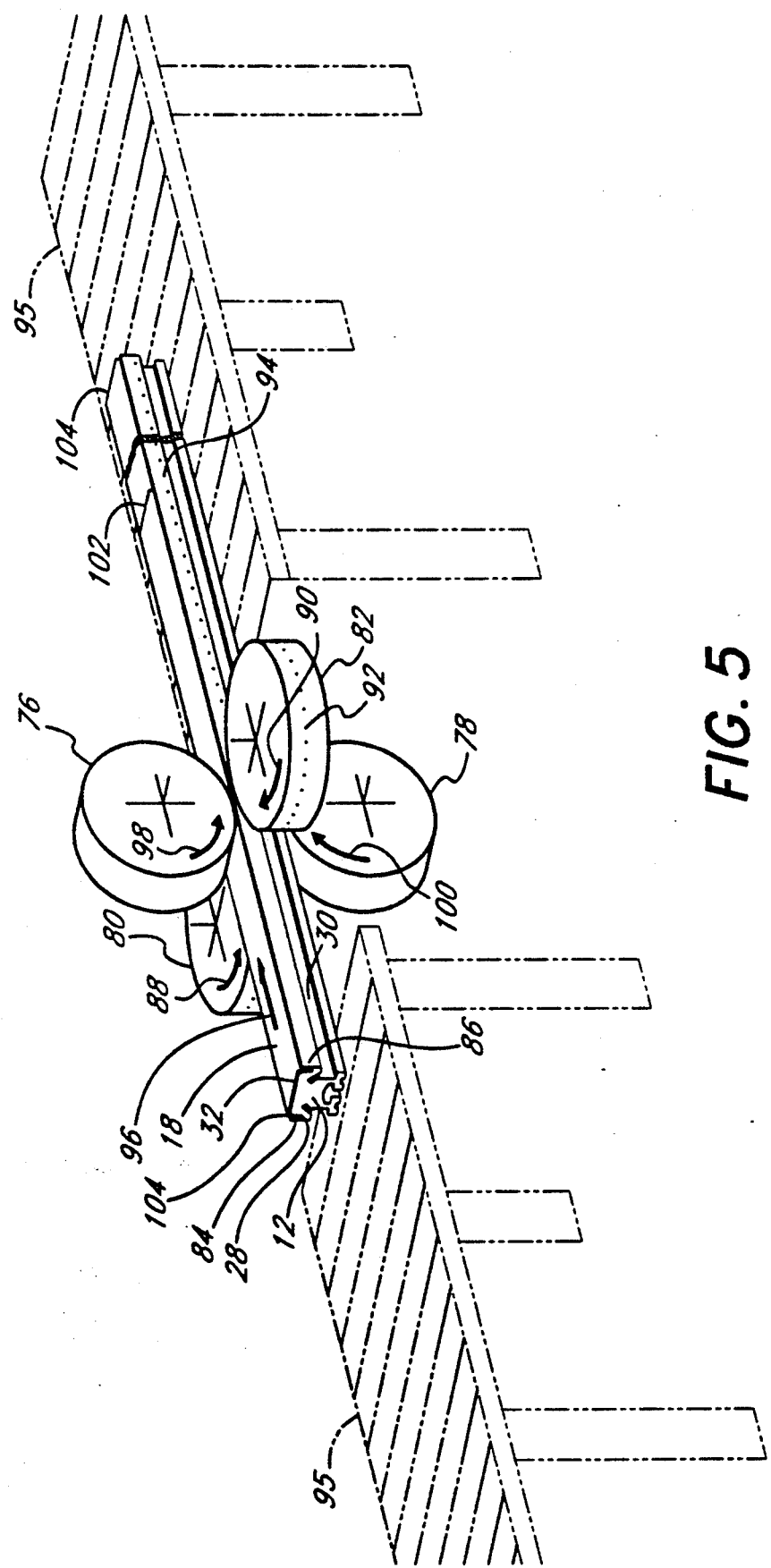
FIG. 5 is a schematic, perspective view of the conductor rail of FIG. 1 being assembled by rotating compression wheels and pulling, deforming wheels.

Refer now to FIG. 5 for a description of a production line method of assembly of a conductor rail 10. Sections of the contact cap 18 have been placed on top of the conductor bar 12 to which a layer of electrically conductive compound has been applied. As one example, a length of the conductor bar 12, approximately 33 feet long, receives three sections of the contact cap 18, each approximately 11 feet long positioned on top of the conductor bar 12. Shown in phantom are roller tables 95 for loading and positioning of the components prior to assembly and for keeping the assemblies straight and level as they enter and leave the final assembly stage.

This assembly passes between a pair of wheels 76 and 78 which compress the contact cap 18 and the conductor bar 12 against each other. A second pair of wheels 80 and 82 pull the conductor bar 12 by its respective sides 84 and 86 and at the same time deform the ears 28 and 30 inwardly (referring back to FIG. 4) forcing the inner projection 58 of the ear 30 downwardly, deforming the tip 50 against the surface 46 of the folded back portion of the side leg 22 of the contact cap 18.

In motion, the pulling wheels 80 and 82 as viewed from the top, are driven (power source not shown) counterclockwise and clockwise respectively as shown by the arrows 88 and 90. These pulling wheels 80 and 82 are provided around the lower halves of their outer peripheral surfaces with spaced cone shaped pins 92 projecting outwardly.

The pins 92 engage the sides of conductor bar 12 and pull the conductor bar between the compression wheels 76 and 78, in the direction shown by the arrow 96. At the same time the conductor is being pulled by the wheels 80 and 82, an upper smooth surface of these wheels bend the ears 28 and 30 of the conductor bar 12 inwardly and clamp the contact cap 18 into a fixed position.

Compression wheel 76 and 78 rotate in the directions shown by the arrows 98 and 100 respectively, resulting from the movement of the conductor rail 10 between the wheels 76 and 78.

Assembly of these conductor rails 10 can be continuous, following one another.

In a preferred example of the conductor rail, the bar 12 is extruded 6101-T6 aluminum alloy, which has excellent electrical conductivity and structural strength. The contact cap 18 is hardened 300 series stainless steel sheet for optimum wear resistance, good corrosion resistants and malleable enough to be roll formed yet resilient enough to hold a shape in the application.

An example of an electrically conductive compound 32 is a grease available from ALCOA, type EJC-2.

What is claimed is:

1. A composite conductor rail for transmission of electrical current to a sliding collector, the conductor rail comprising:
    an elongated conductor bar; and
    an elongated wear-resistant contact cap on said bar having a top portion engaging a top surface of said bar and depending side legs engaging sides of the bar;
    said conductor bar having integral deformable clamping means extending the length of the bar for holding said cap legs in tension and holding said cap top portion in good electrical engagement with said bar top surface;
    wherein said clamping means are upwardly extending integral ears disposed on opposite sides of said conductor bar extending parallel to said sides of the bar, each ear having a projection extending toward said conductor bar which engages a portion of one or the other of said depending side legs to assure said good electrical engagement.

2. The rail of claim 1 in which the contact cap side legs have upwardly turned edges engaged by the projections.

3. The rail of claim 2 in which the position of said upwardly turned edges is controlled with respect to the conductor bar by the clamping means insuring adequate tension on the side legs of the cap.

4. The rail of claim 1 in which said bar is extruded aluminum and said cap is made of stainless steel.

5. A conductor rail, comprising:
    an elongated conductor bar having an upper surface with two sides and two walls spaced from said two sides thereby forming two gaps; and
    a cap having a top and at least one depending leg which fits within said at least one of said two gaps;
    said walls essentially consisting of two straight deformable portions lying parallel to said sides, at least one of said two walls having a projection extending toward said conductor bar which cooperates with said at least one depending cap leg to hold said cap in good electrical contact with said bar's upper surface.

6. The rail of claim 5, wherein each cap leg is doubled over on its lower end to form an upwardly facing edge on the outer side of each leg, said extending projections engaging said leg edges to hold said cap in good electrical contact with said bar.

7. A conductor rail for transmission of electrical current to a sliding collector, the conductor rail comprising:
    an elongated aluminum conductor bar having a relatively flat top; and
    an elongated stainless steel contact cap having depending side legs and a flat surface to cooperate with the flat top of the conductor bar;
    said side legs having their ends outwardly doubled back forming a generally upward facing edge on each leg, extending lengthwise of the cap,
    said conductor bar having integral ears extending lengthwise of the bar disposed on opposite sides of the bar, said ears projecting upwardly and parallel to the main body of the bar in an essentially straight fashion and including projections extending downwardly toward the main body,
    said ears forming a cavity adjacent to the main body of the bar on each side of the bar for receiving said cap legs, said legs having ends extending downwardly into the cavity,
    said contact cap legs being held in tension by the downwardly extending projections of the ears applying force to said side leg edges.

8. A method of making an electric conductor rail comprised of an electrically conductive elongated bar and a resilient, elongated, wear resistant, electrically conductive cap for making contact with the sliding current collector, including the steps of:
    extruding the bar with essentially straight integral ears having downwardly extending projections, said ears running lengthwise of the bar, extending obliquely outward of the main body of the bar;
    forming the elongated cap from sheet metal, folding the edges back on the sides of the sheet and folding the sides at right angles to the top of the sheet forming side legs;
    pressing the cap onto the top of the bar with the side legs engaging sides of the bar; and deforming the ears inwardly to lie parallel to the sides of the main body thus forcing said downwardly extending projections against the side legs causing said legs to move downwardly while continuing said pressing;

whereby the side legs are clamped under tension, holding the cap downward against the top of the bar.

9. The method as in claim 8 in which the contact cap is held in continuous contact with the conductor bar the full length of the bar.

10. A method of permanently attaching a wear resistant, electrically conductive contact cap over a less wear resistant conductor bar of good electrical conductance, the steps including:

extruding an elongated bar of ductile material having essentially straight elongated ears extending lengthwise of the bar and positioned obliquely away from the sides of the body of the bar, said ears provided with inwardly and downwardly extending projections;

forming an elongated contact cap of metal having legs at right angles to the body of the cap, said legs each extending lengthwise of the cap and having an edge to cooperate with the projections of the ears;

pressing the legs of the cap between the extruded body of the bar and the ears; and deforming the ears inwardly and downwardly toward the body until the ears are essentially parallel to the sides of the body of the bar thereby causing the ear projections to be deformed against said leg edges resulting in the holding of the cap legs in tension.

* * * * *